Sept. 7, 1937.  N. HACKETT  2,092,155
KNOCK-DOWN STRUCTURE
Filed May 31, 1935  3 Sheets-Sheet 1
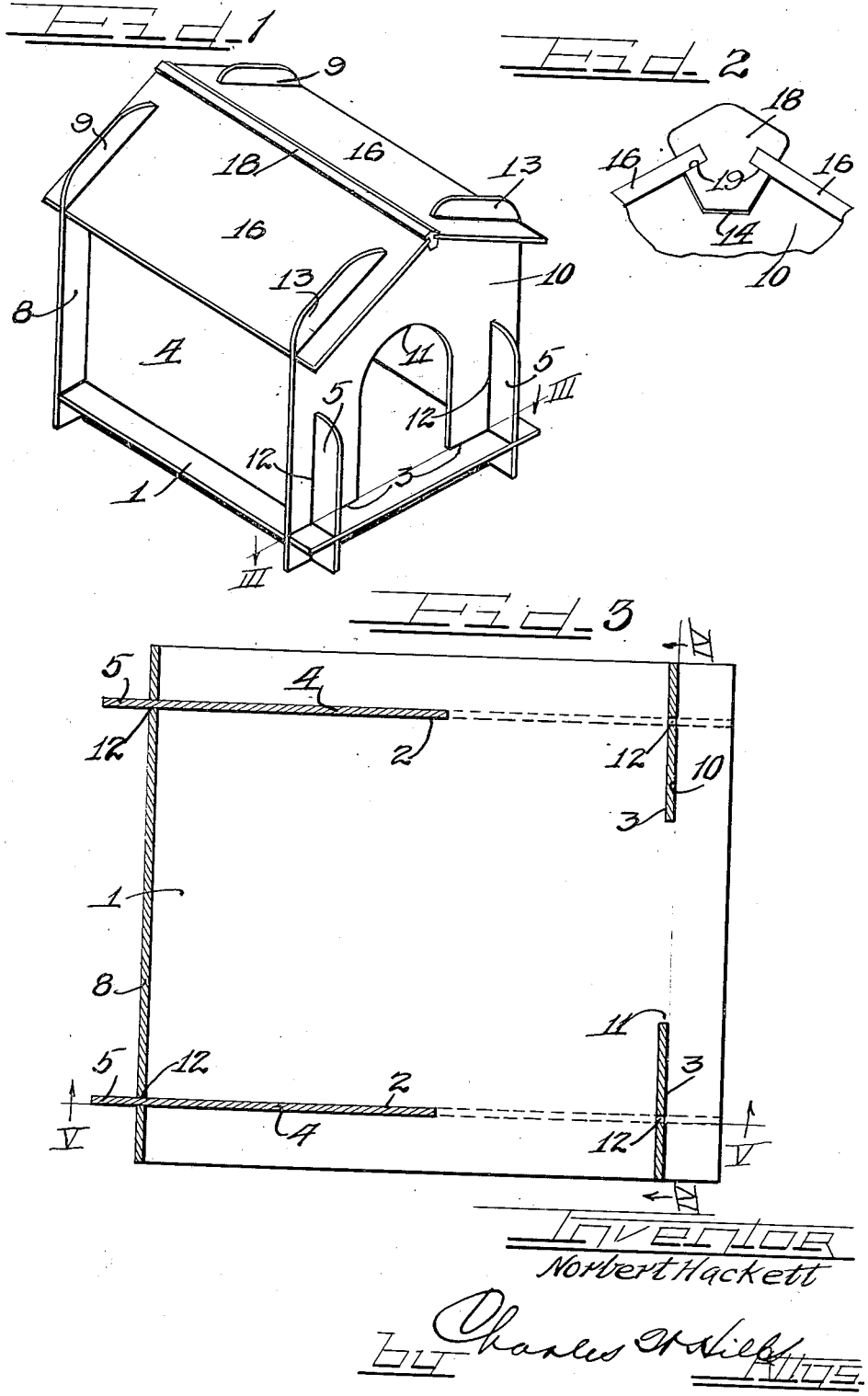

Sept. 7, 1937.          N. HACKETT                2,092,155
                    KNOCK-DOWN STRUCTURE
                     Filed May 31, 1935          3 Sheets-Sheet 2
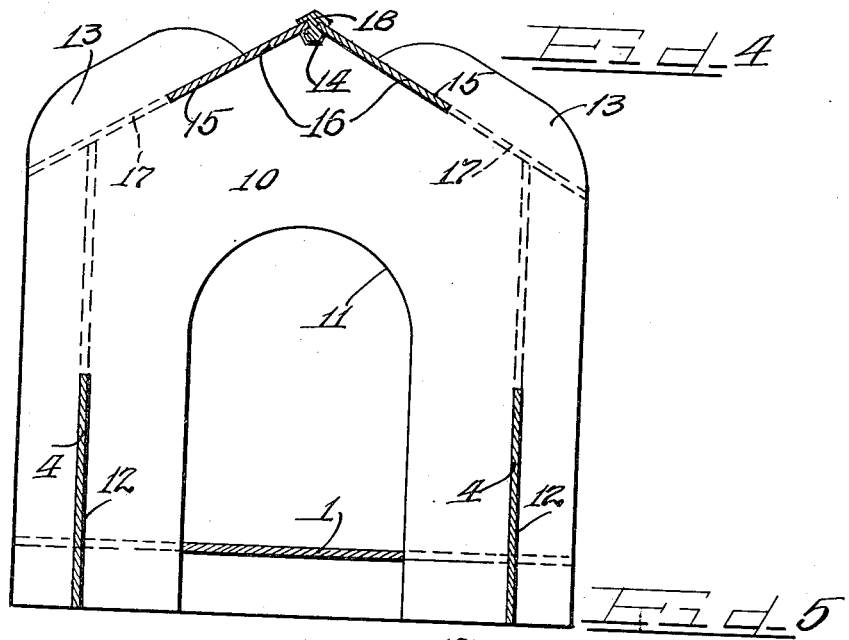
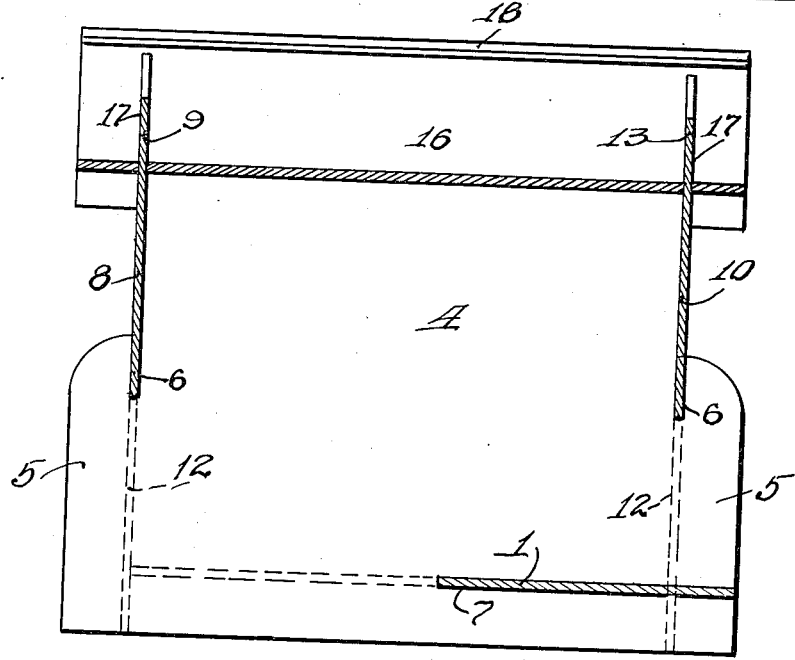

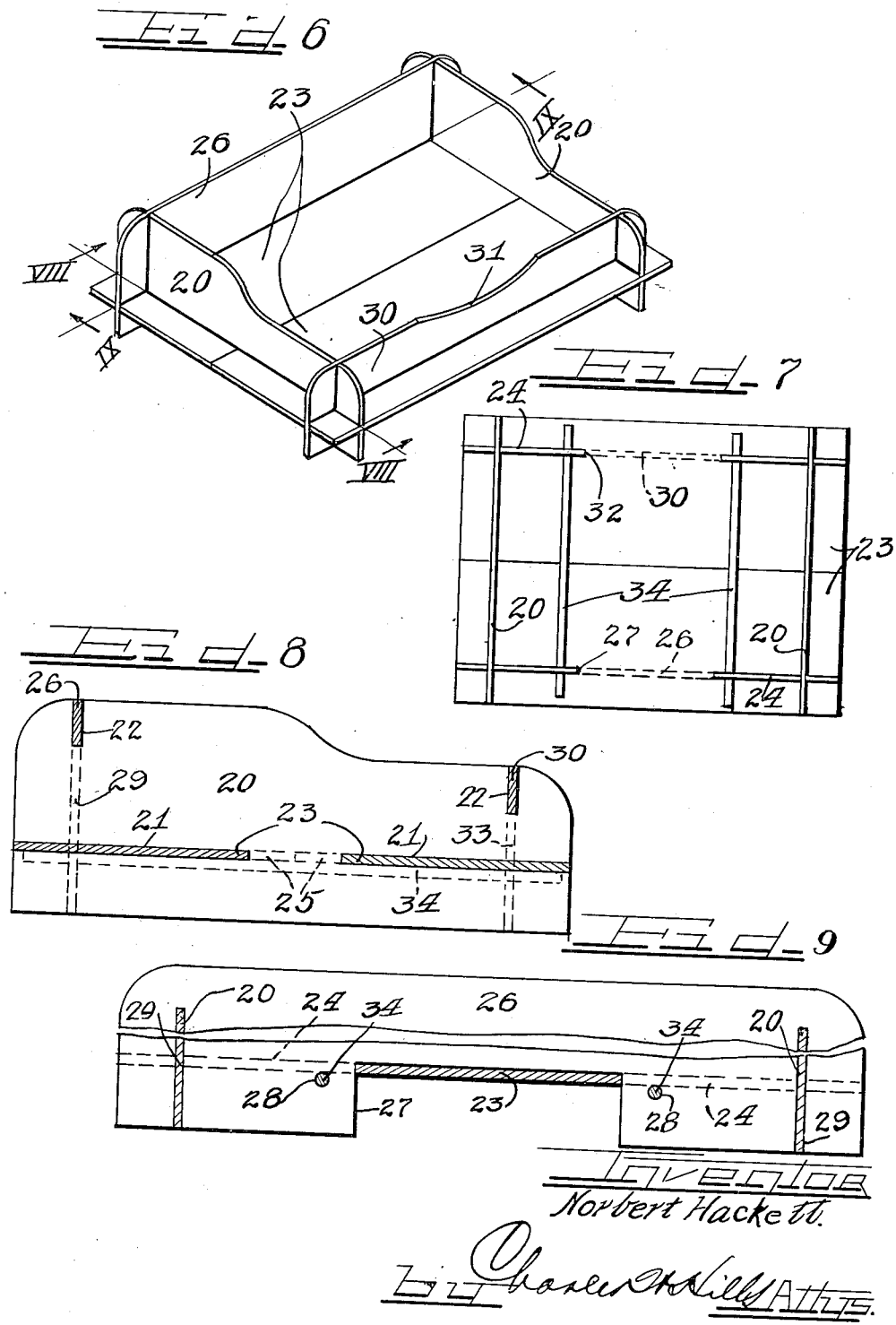

Patented Sept. 7, 1937

2,092,155

UNITED STATES PATENT OFFICE 2,092,155

KNOCK-DOWN STRUCTURE

Norbert Hackett, Glencoe, Ill.

Application May 31, 1935, Serial No. 24,289

8 Claims. (Cl. 119—19)

The present invention relates to a knock-down or collapsible structure, two forms of which are illustrated in the drawings in the form of a dog house and a dog bed. It is intended to construct the devices out of lightweight material, such as plywood, thin wooden boards, or the like. The improved knock-down structure comprises a plurality of wall members provided with slots opening at their outer ends through one or more of the edges of the wall members and extending only partially into the wall members to afford an arrangement whereby the slotted wall members may be assembled in a predetermined order locking one another in position until a final locking means is engaged in place to complete the knock-down structure.

It is an object of this invention to provide a knock-down structure, such as a dog house, without the use of nails, screws or similar fastening means by providing partially slotted wall members which lockingly interfit one another to form an assembled structure.

It is also an object of this invention to provide a knock-down structure adapted to be constructed of lightweight material, formed into partially slotted members adapted to interfit one another and including a final locking means which when in position prevents the dismemberment of the structure.

It is a further object of this invention to provide a knock-down structure, the wall members of which are partially slotted to interfit one another and having intercepting wings or flanges which serve as reinforcing or bracing means to strengthen the assembled structure.

It is furthermore an object of this invention to provide a simple and easily assembled knock-down structure, such as a dog bed, adapted to be formed by means of a plurality of partially slotted members adapted to be lockingly interfitted one with another and having marginal portions thereof intersecting one another to provide reinforcing or strengthening corners for the structure.

It is an important object of this invention to provide an inexpensive and simplified form of knock-down structure adaptable for various purposes, and comprising a plurality of wall members, a floor and roof pieces, all of which are provided with slots projecting inwardly from certain of the edges thereof to permit the various members forming the structure to be removably interlocked with one another in a predetermined order to form a structure having intersecting wing portions for strengthening the device, and furthermore including a final locking member adapted to engage one or more of the pieces of the device to hold the entire structure locked in assembled form ready for use.

Other and further important objects of this invention will be apparent from the disclosures in the specification and the accompanying drawings.

The invention (in preferred forms) is illustrated in the drawings and hereinafter more fully described.

On the drawings:

Figure 1 illustrates a perspective view of a knock-down structure in the form of a dog house embodying the principles of this invention.

Figure 2 is an enlarged fragmentary end view of the apex portion of the roof of the dog house.

Figure 3 is an enlarged sectional plan view of the dog house taken in the plane of line III—III of Figure 1.

Figure 4 is a vertical sectional view of the dog house taken on line IV—IV of Figure 3.

Figure 5 is a vertical sectional view of the side of the dog house taken on line V—V of Figure 3.

Figure 6 is a perspective view of a modified form of the knock-down structure in the form of a dog bed.

Figure 7 is a bottom plan view of the dog bed.

Figure 8 is an enlarged vertical sectional view taken on line VIII—VIII of Figure 6.

Figure 9 is an enlarged vertical sectional view taken on line IX—IX of Figure 6.

As shown on the drawings:

The improved knock-down structure embodying the principles of this invention is adapted for use in the construction of dog houses, dog beds and other similar structures, all of which may be assembled without the use of nails, screws or other fastening means.

Figures 1 to 5, inclusive, illustrate one form of the knock-down structure, namely, a dog house. The dog house comprises a bottom or floor 1 constructed of plywood, sheet lumber or the like and having a pair of spaced longitudinally directed slots 2 extending inwardly from the rear edge to a point substantially midway between the front and rear edges of the floor. The floor 1 is also provided with a pair of aligned transverse slots 3 (Figure 3) which are positioned a short distance from the front edge of the floor and project inwardly from opposite sides of the floor for a distance approximate one-third of the width of the floor.

The slotted bottom 1 is moved into interfitting relation with a pair of side walls 4 which are also constructed of plywood, sheet lumber or the like. Each of the side walls 4 is provided with integral end extensions, flanges or wings 5, the upper ends of which are rounded, as clearly illustrated in Figure 5, and terminate a short distance above the horizontal middle line of the side wall. A short, vertical downwardly directed slot 6 projects downwardly from the upper end of the wing 5 where it joins the main body portion of the side wall 4 and downwardly a short distance equal substantially to the radius of the curvature of the upper end of the wing. Each of the side walls 4 is also provided with a longitudinally directed slot 7 which extends inwardly from the vertical edge of the front wing 5 inwardly parallel to the bottom edge of the side wall to a point substantially midway between the front vertical edge of the front wing and the plane of the rear slot 6 which partially separates the rear wing 5 from the main body of the side wall 4. The slots 7 in the side walls are equal in length to the slots 2 in the floor 1. The floor 1 is projected rearwardly into the side wall slots 7 and the parallel longitudinally disposed floor slots 2 fit over the side walls 4 thereby allowing the side walls and the floor to interfit one another with the front vertical edges of the front side wall wings 5 disposed in the plane of the front edge of the floor 1, as clearly illustrated in Figure 1.

A rear or back wall 8 constructed of plywood or the like is next engaged in position. The rear wall 8 is equal in width to the width of the floor 1 and is formed with a straight bottom edge and parallel side edges. The upper ends of the side edges terminate or merge into the outer ends of a pair of rear wall top flanges or wings 9, the upper edges of which are curved or rounded, as illustrated in Figure 1, and extend upwardly to within a short distance of the tapered or pointed middle portion of the rear wall. The apex of the rear wall 8 is provided with a tapered notch and with two downwardly inclined slots similar to a notch and slots which will hereinafter be more fully described in connection with the description of the front wall of the dog house.

The knock-down structure also includes a front wall 10 constructed of plywood or the like, said front wall being equal in width to the width of the floor 1 and the width of the rear wall 8. The front wall 10 is constructed substantially the same as the rear wall 8 with the exception that it is provided with an arched opening or doorway 11 which extends upward from the bottom edge of the front wall 10 to a height substantially two-thirds of the height of the middle portion of the dog house. The front wall 10 as well as the rear wall 8 is provided with a pair of parallel slots 12 which are parallel to the side edges of the front and rear walls and extend upwardly from the bottom edges of said walls to a height substantially half that of the side edges of the front and rear walls. As clearly illustrated in Figure 5, the slots 6 and 12 permit the rear and the front walls of the dog house to lockingly interfit with the side walls 4. By referring to Figure 1, it will be noted that the slotted arrangement of the various walls of the dog house hereinbefore described permits the marginal portions of the walls to intersect one another to strengthen or reinforce the corners of the dog house by the intersecting flange or wing portions of the wall members.

The upper edge of the front wall 10 converges or tapers and is provided with inclined flanges or wings 13 similar to the wings 9 of the rear wall. The upper middle portion of the front wall 10 converges or tapers at the middle portion to extend upwardly between the inner ends of the wings 13, as clearly illustrated in Figure 4. The apex portions of both the front and rear walls are cut away to provide tapered notches 14. Both the front and rear walls are also provided with inclined slots 15 which are directed downwardly from the upper ends of the wings 13 and 9 to points substantially midway between the outer edges of the front and rear walls and the apex points of said walls.

The bottom, front, back and the side walls form a housing the top of which is adapted to be closed by means of a pair of roof boards 16 constructed of plywood or other suitable material. Each of the top walls or roof boards 16 is provided with a pair of parallel transversely disposed slots 17 which extend inwardly from the outer or bottom longitudinal edges of the roof boards to approximately one-half the width of the roof boards.

The two roof boards 16 are adapted to be engaged in position by sliding the same downwardly and outwardly into inclined positions from the apex of the dog house with the slots 17 engaging the flanges or wings 9 and 13 of the back and front walls of the dog house and with the unslotted longitudinal margins of the roof boards 16 projecting into the slots 15 provided in the end walls 8 and 10. When the two roof boards 16 are in position as illustrated in Figure 1, the upper longitudinal margins thereof are slightly separated from one another leaving a top opening which is adapted to be closed by means of a ridge pole or bar 18 of substantially wedge-shaped cross-section to seat in the tapered notches 14 provided in the front and back walls of the dog house. The ridge pole 18 is provided with side grooves 19 which extend through the entire length of the ridge pole. To lock all of the wall members of the dog house in assembled relation, as illustrated in Figure 1, the grooved ridge bar 18 is slidably engaged over the adjacent upper longitudinal edges of the two top boards 16 and is pushed rearwardly into its final locking position with the ends of the ridge bar registering with the ends of the top boards 16.

Attention is called to the fact that all of the wall members of the dog house have the slots positioned the same distance inwardly from the edges of the various wall members, thereby providing an arrangement wherein the intersecting flanges or wing members of the various walls project the same distances from the main body of the dog house to form an effective exterior appearance for the dog house. Attention is also called to the fact that the assembly of the various members forming the dog house is accomplished without the use of tools or fastening means, such as nails, screws, clamps or the like. When desired, the dog house may be dismantled by removing the various members in a reverse order from that in which the members were assembled.

With the lower margins of the side walls 4 and the end walls 8 and 10 projecting beneath the level of the floor 1, it will be noted that the floor 1 is elevated above the surface of the ground since the lower margins of the side and end walls serve as supporting legs for the dog house.

Referring now to Figures 6 to 9, inclusive, a modified form of knock-down structure is illustrated and represents a dog bed comprising a pair of side or end walls 20 constructed of plywood or other suitable material. The side walls 20 have the top margins thereof shaped so that the rear half of the side wall is higher than the front half. Each of the side walls 20 is provided with two aligned longitudinally disposed slots 21 which extend inwardly toward one another from the front and rear edges of the side walls. Each of the side walls 20 is also provided with two parallel upper slots 22 which extend downwardly from the upper edge of the side walls for a short distance.

The two side walls 20 are spaced apart in parallel relation and are releasably engaged by two floor boards 23 constructed of plywood or other suitable material. The floor boards 23 are each provided with a pair of aligned longitudinally positioned slots 24 which extend inwardly toward one another from the end edges of the floor boards approximately one-third of the length of the floor boards leaving a solid portion between the inner ends of said slots. Each of the floor boards 23 is also provided with a pair of parallel short transverse slots 25. These short transverse slots 25 of the floor members are adapted to fit over the solid portions of the side walls 20 between the inner ends of the side wall slots 21.

In assembling the dog bed the two floor boards 23 are projected inwardly from the front and back edges of the side walls 20 into abutting relation, as illustrated in Figure 6, with the short slots 25 engaging around or over the solid portions of the side walls between the side wall slots 21, which slots in turn receive the floor boards. With the floor boards in interlocking engagement with the end walls 20, the end walls 20 intersect the longitudinal slots 24 of the floor boards 23.

A rear wall 26 constructed of plywood or other suitable material is provided for interlocking engagement with the rear ends of the side walls 20 and the rear portion of the rear floor board 23. The rear wall 26 has the middle portion of the lower longitudinal margin thereof cut away to provide an opening 27, as clearly illustrated in Figure 9. The rear wall 26 is also provided with a pair of round apertures or openings 28 which are provided on opposite sides of the notch or cut-out section 27. A pair of transverse parallel slots 29 are also provided in the rear wall 26 and said slots extend upwardly from the lower edge of the rear wall to within a short distance of the upper edge of said wall. The rear wall 26 is adapted to be slidably engaged downwardly over the rear ends of the side walls 20 with the rear wall slots 29 sliding over the side walls and allowing the bottom or leg portions of the rear wall on opposite sides of the notch 27 to project downwardly through the slots 24 of the rear floor board 23 thereby interlocking the rear floor board with the rear wall 26 and the rear end of the side walls 20. By referring to Figure 6, it will be noted that the ends of the rear wall 26 and the rear ends of the side walls 20 intersect one another and together with the corners of the floor board form reinforced corners for the rear portion of the dog bed.

To form the front end of the dog bed, a front wall or board 30 is provided of a height substantially the same as that of the front portions of the side walls 20. The front wall 30 is constructed of plywood or other suitable material and has the middle portion of the upper edge thereof cut away to form a concave upper recess 31. The front wall 30 has the middle portion of the lower margin thereof cut away to provide a notch or recess 32 to form supporting legs on opposite sides of said notch.

The front wall 30 is also provided with a pair of apertures or openings 28 positioned on opposite sides of the notch 32 and directly in front of the rear apertures 28 provided in the rear wall 26. The front wall 30 is also provided with a pair of parallel transverse slots 33 which extend upwardly from the lower edge of the front wall to within a short distance of the upper edge thereof. The front wall 30 is removably engaged downwardly over the front end of the side walls 20 with the front wall slot 33 engaging over the side walls to permit the lower foot portions of the front wall to project through the longitudinal slots 24 of the front floor board to rest on the ground. By referring to Figure 6, it will be noted that when the front wall is in position, the front ends of the side walls 20 and the ends of the front wall 30 intersect one another and that the front corners of the front floor board 23 intersect the ends of the front wall 30 as well as the front ends of the side walls 20. This arrangement provides a reinforcement at each of the front corners of the dog bed.

For the purpose of holding all the floor and wall members of the dog bed locked in assembled relation, a pair of round dowel pins or rods 34 are projected through the openings 28 of the front wall 30 and the rear wall 26 and pass beneath the abutting floor boards 23 to serve as braces beneath the floor boards as well as final locking members for the entire assembly of the dog bed.

Attention is called to the fact that with the lower margins of the front, rear and side walls of the dog bed projecting downwardly through the floor boards 23, supporting legs are provided for the dog bed serving to hold the floor of the dog bed elevated above the ground or support on which the dog bed rests. The entire dog bed may be assembled and held in locked position without the use of nails, screws or other fastening devices.

While two forms of knock-down structures have been illustrated and described embodying slotted arrangements of interfitting and interlocking wall or panel members of a knock-down construction, it will of course be understood that the knock-down principle may be applied to innumerable other articles without departing from the principles of this invention.

I claim as my invention:

1. A knock-down structure including a plurality of one-piece board-like members having slots parallel to selected edges thereof permitting said members to be interlocked in intersecting relation, and locking means slidably interfitting two of said members to lock the assembled structure against dismemberment.

2. A knock-down structure comprising a slotted bottom and a plurality of wall members having slots parallel to selected edges and spaced equidistantly therefrom permitting the bottom and the wall members to be interlocked in a predetermined order one with another forming an assembled structure having exterior intersecting marginal portions and three way intersecting corners for strengthening the structure.

3. A knock-down structure comprising a plurality of wall members and a bottom having parallel slots therein disposed parallel to selected edges of said members and bottom and spaced equidistantly from said edges permitting the members and said bottom to be removably interfitted and interlocked with one another to form an assembled structure having two way intersecting wing portions and three-way intersecting corners.

4. A knock-down structure comprising a bottom, side walls interfitting with the bottom and holding the same spaced above a support, said bottom and side walls having slots extending inwardly at right angles to selected edges thereof with the slots of adjacent edges disposed at right angles to one another, and front and rear walls having slots at right angles to one of the edges thereof for interfitting the side walls and the bottom and forming a structure having marginal portions of the walls and the corners of said bottom intersecting one another to form exterior winged corners for the structure.

5. A knock-down structure comprising a slotted bottom, slotted side walls interfitting the slots of the bottom to hold the same spaced above a support, slotted front and rear walls interfitting the slots of the side walls and the slots of the bottom and forming a structure having marginal portions of the walls and said bottom intersecting one another to form exterior three winged corners for the structure, and locking means slidably engaged with a pair of said walls for holding the structure locked in assembled relation.

6. A knock-down structure comprising a slotted bottom, slotted side walls interfitting the bottom to support the same, a slotted rear wall interfitting the side walls and abutting against the rear end of the bottom, a slotted front wall having an entrance opening therein and interfitting the side walls and said bottom, a pair of slotted roof walls interfitting the front and rear walls for closing the top of the structure, and a grooved locking bar slidably engaged on adjacent edges of the roof walls to connect the same and lock the entire assembled structure against disassemblage.

7. A knock-down structure comprising a bottom, a pair of side walls intersecting the same, a front wall intersecting the side walls and the bottom, a rear wall intersecting the side walls and abutting against the inner end of said bottom, a pair of top walls intersecting the front and the rear walls, and a ridge member for connecting the top walls and locking the entire structure in assembled form.

8. A knock-down structure comprising a bottom and a plurality of side and end walls all void of any attachments, said end and side walls intersecting one another and also intersecting the bottom to form a housing having marginal portions of the bottom and said walls projecting from one another beyond the corners of the housing in the form of intersecting wings.

NORBERT HACKETT.